US010804727B2

(12) United States Patent
Gu et al.

(10) Patent No.: US 10,804,727 B2
(45) Date of Patent: Oct. 13, 2020

(54) WIRELESS POWER DISTRIBUTION AND SCHEDULING

(71) Applicant: International Business Machines Corporation, Armonk, NY (US)

(72) Inventors: Yu Gu, Cedar Park, TX (US); Inseok Hwang, Austin, TX (US); Su Liu, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 16/059,861

(22) Filed: Aug. 9, 2018

(65) Prior Publication Data

US 2018/0351394 A1 Dec. 6, 2018

Related U.S. Application Data

(63) Continuation of application No. 15/211,695, filed on Jul. 15, 2016, now Pat. No. 10,084,336.

(51) Int. Cl.
*H02J 7/02* (2016.01)
*H02J 5/00* (2016.01)
*H04B 1/3883* (2015.01)
*H02J 50/80* (2016.01)
*H02J 7/00* (2006.01)

(52) U.S. Cl.
CPC .............. *H02J 7/025* (2013.01); *H02J 5/005* (2013.01); *H02J 7/0071* (2020.01); *H02J 50/80* (2016.02); *H04B 1/3883* (2013.01)

(58) Field of Classification Search
CPC .......... H02J 7/025; H02J 7/0073; H02J 5/005; H04B 1/3883
USPC ........................................................ 320/108
See application file for complete search history.

(56) References Cited

U.S. PATENT DOCUMENTS

| 6,184,651 | B1 | 2/2001 | Fernandez | |
| 6,240,337 | B1* | 5/2001 | Marr, Jr. | H02J 1/16 700/286 |
| 7,522,878 | B2* | 4/2009 | Baarman | H02J 13/0062 455/41.1 |
| 8,044,782 | B2* | 10/2011 | Saban | B60N 2/002 340/438 |
| 8,307,484 | B2* | 11/2012 | Porat | E04H 4/1281 15/1.7 |

(Continued)

FOREIGN PATENT DOCUMENTS

WO 2014107465 7/2014

OTHER PUBLICATIONS

"U.S. Appl. No. 15/211,695 Office Action", dated Dec. 29, 2017, 12 pages.

(Continued)

*Primary Examiner* — M Baye Diao
(74) *Attorney, Agent, or Firm* — Richard B. Thomas (57) ABSTRACT

A wireless charger can determine a power requirement associated with operating at least a first device at a scheduled time. The wireless charger can determine a power emission level for the wireless charger based, at least in part, on the power requirement, such that the power emission level will provide sufficient wireless energy to satisfy the power requirement. The wireless charger can transmit wireless energy at the power emission level to cause the device to operate.

20 Claims, 7 Drawing Sheets

(56) References Cited

U.S. PATENT DOCUMENTS

| | | | | |
|---|---|---|---|---|
| 8,536,829 | B2* | 9/2013 | Chen | H02J 7/0045 |
| | | | | 320/108 |
| 8,756,743 | B2* | 6/2014 | Baertschi | B26B 21/4056 |
| | | | | 15/167.1 |
| 8,947,042 | B2 | 2/2015 | Kirby et al. | |
| 8,970,180 | B2* | 3/2015 | Li | H02J 50/10 |
| | | | | 320/155 |
| 9,035,601 | B2 | 5/2015 | Kim et al. | |
| 9,337,943 | B2* | 5/2016 | Mosebrook | H02J 4/00 |
| 2004/0130915 | A1* | 7/2004 | Baarman | C02F 1/008 |
| | | | | 363/21.02 |
| 2009/0212628 | A1* | 8/2009 | Baarman | H02J 13/0086 |
| | | | | 307/31 |
| 2010/0213895 | A1* | 8/2010 | Keating | H02J 7/0027 |
| | | | | 320/108 |
| 2010/0253281 | A1 | 10/2010 | Li | |
| 2013/0020988 | A1 | 1/2013 | Kim et al. | |
| 2013/0170417 | A1* | 7/2013 | Thomas | H04W 52/0216 |
| | | | | 370/311 |
| 2013/0237272 | A1* | 9/2013 | Prasad | H04B 7/0617 |
| | | | | 455/517 |
| 2013/0257364 | A1 | 10/2013 | Redding | |
| 2014/0285317 | A1 | 9/2014 | Shimizu | |
| 2015/0042287 | A1 | 2/2015 | Liu et al. | |
| 2015/0048789 | A1 | 2/2015 | Kim | |
| 2015/0097442 | A1* | 4/2015 | Muurinen | H02J 50/90 |
| | | | | 307/104 |
| 2015/0177330 | A1 | 6/2015 | Morris | |
| 2015/0207340 | A1 | 7/2015 | McFarthing | |
| 2015/0244201 | A1 | 8/2015 | Chu | |
| 2016/0359376 | A1* | 12/2016 | Zeine | G01R 31/40 |
| 2018/0019610 | A1 | 1/2018 | Gu et al. | |

OTHER PUBLICATIONS

Baroudi, et al., "Mobile Radio Frequency Charger for Wireless Sensor Networks in the Smart Grid", Wireless Sensor Laboratory, Computer Engineering Department, King Fahd University of Petroleum and Minerals, 2014, 5 pages.

Waffenschmidt, et al., "Wireless Power for Mobile Devices", IEEE, Oct. 2011, 9 pages.

List of IBM Patents or Applications Treated as Related.

Cheng et al., "Optimal Scheduling for Quality of Monitoring in Wireless Rechargeable Sensor Networks," IEEE Transactions on Wireless Communications, vol. 12, Issue 6, Jun. 2013, 1 page.

Dai et al., "Safe Charging for Wireless Power Transfer," IEEE Conference on Computer Communications (IEEE INFOCOM 2014), Apr. 2014, pp. 1105-1113. <https://www-users.cs.umn.edu/~tianhe/Papers/06848041.pdf>.

Fu et al., "Minimizing charging delay in wireless rechargeable sensor networks," 2013 Proceedings IEEE INFOCOM, Apr. 14-19, 2013, 1 page.

* cited by examiner

WIRELESS POWER DISTRIBUTION AND SCHEDULING

RELATED MATTERS

This application is a continuation of and claims the priority benefit of U.S. application Ser. No. 15/211,695, filed Jul. 15, 2016.

BACKGROUND

Embodiments of the inventive subject matter generally relate to the field of wireless power, and, more particularly, to wireless power distribution and scheduling.

Wireless power charging is used to deliver energy to power-consuming devices. Typically, the amount of power delivered is a fixed amount set by the transmitter. However, this can lead to an inefficiency if the amount of power is more than necessary, resulting in wasted or unconsumed wireless energy. Delivering too little energy may not effectively charge the power-consuming device. Delivering too much energy, or delivering energy at a time when it will not be consumed, results in waste. Thus, an improvement to wireless power systems may address these concerns.

SUMMARY

Provided is a method, system, computer program product, and apparatus for wireless power distribution and scheduling. In one embodiment, a method performed by a wireless charger comprises determining a power requirement associated with operating at least a first device at a scheduled time. A power emission level for the wireless charger is determined based, at least in part, on the power requirement. The wireless charger transmits wireless energy at the power emission level.

BRIEF DESCRIPTION OF THE DRAWINGS

The aspects of the disclosure may be better understood by those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to example household appliances, the implementation of this technology is not limited to the described examples. For example, other implementations may be used for different types of power-consuming devices and in environments other than a household. In some instances, well-known instruction instances, protocols, structures and techniques have not been shown in detail in order not to obfuscate the description.

Wireless charging (also referred to as wireless power transfer or wireless energy transmission) is the transmission of electrical energy from a wireless charger (power source) to a power-consuming device, without the use of discrete man-made conductors. There are several different wireless charging technologies that use time-varying electric, magnetic, or electromagnetic fields. In wireless power transfer, a wireless charger connected to a power source conveys the field energy across an intervening space to one or more receivers, where it is converted to electricity and consumed by a power-consuming device. In this disclosure, wireless charging may involve the transmission of radiative (or far-field) technologies. The wireless transmission of energy may be "aimed" at a receiver, (such as power beaming or beam-formed signals) or may be emitted in broadcast form. For the sake of simplicity, this disclosure describes broadcast radiative energy. However, both forms of wireless charging may be used with the techniques described.

As the technology for wireless charging is evolving, several manufactures and groups have developed different interfaces for coordinating wireless charging. Disparate user interfaces, redundant hardware, and inconsistent scheduling features may frustrate some users or otherwise prevent their enjoyment of this technology. Furthermore, there is an interest in using wireless charging to provide power to traditional wired devices. However, with the introduction of more wireless chargers and/or more power-consuming devices, management of the wireless charging environment becomes more complicated. Similarly, as described above, wireless charging can become inefficient if the amount of energy delivered is too little or too much than what is needed by a power-consuming device at a particular time.

This disclosure provides describes a technique for a wireless charger to determine and deliver a proper amount of energy to a device to operate the device at a time when the device needs the energy. The wireless charger may determine a power requirement associated with operating at least a first device at a scheduled time. For example, a central scheduling interface may maintain a schedule of operation for the device. A wireless charging controller may also utilize a device energy profile to determine how much energy is needed by the device for one or more functions of the device. Using the schedule and device energy profile, the wireless charger may determine a power emission level that the wireless charger should transmit wireless energy to ensure that the device has sufficient energy to operate without transmitting excess wireless energy.

In some embodiments, the techniques described herein can provide a centralized control of several devices. Separate hardware or software may not be needed for each power-consuming device, and traditional wired devices may be transformed into "smart" devices by proactively scheduling and managing the amount of wireless energy delivered from a wireless charger. Furthermore, in an environment, multiple power-consuming devices can be wirelessly powered by one or more wireless chargers that coordinate power emissions based on the power requirements for the multiple devices.

Figure 1:
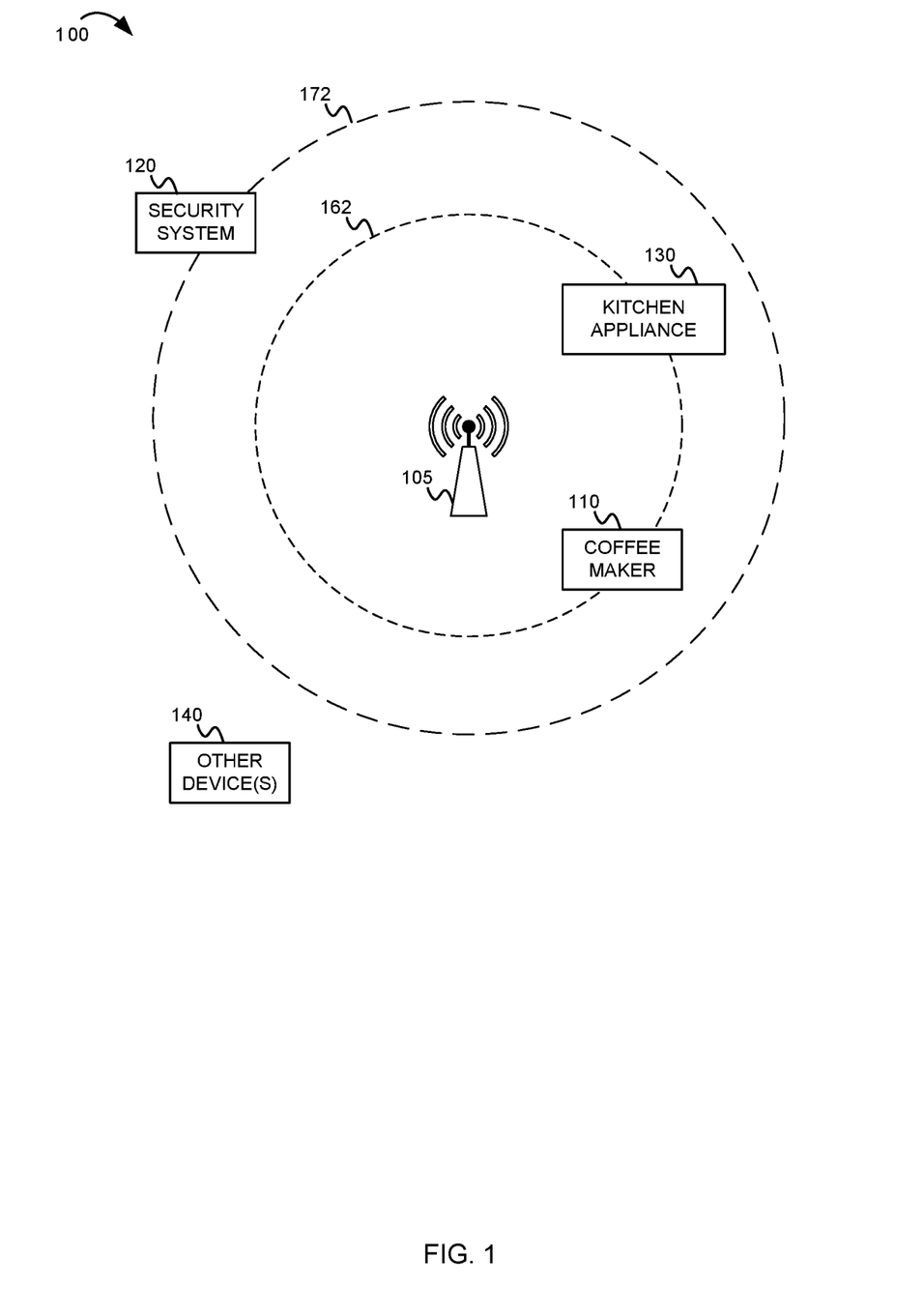
FIG. 1 is an illustration showing wireless power supply for a plurality of devices to introduce concepts of this disclosure.

FIG. 1 is an illustration showing wireless power supply of a plurality of devices to introduce concepts of this disclosure. In the wireless charging system 100 shown a FIG. 1, a wireless charger 105 provides radiated energy to a plurality of devices. The power-consuming devices include a coffee maker 110, a security system 120, a kitchen appliance 130, and may include other device(s) 140. The radiated energy is emitted from a transmitting antenna included in the wireless charger 105. In FIG. 1, a first amount of wireless energy (shown as first area 162) reaches the coffee maker 110 and kitchen appliance 130. A second amount of wireless energy (shown as second area 172) reaches the security system 120.

By increasing or decreasing the power emission level transmitted by the wireless charger 105, the wireless charger 105 can control how much energy is delivered to each appliance. For example, when power is needed by the security system 120, the wireless charger 105 may use a higher power emission level so that wireless energy is transmitted to (and reaches) the security system 120 in the second area 172. However, when power is not needed by the security system 120, and is needed by the coffee maker 110 or kitchen appliance 130, the wireless charger 105 may use a lower power emission level that results in wireless energy transmitted to (and reaching) the coffee maker 110 or kitchen appliance 130. Thus, a lower power emission level may result in cost savings and less waste of unconsumed energy. Similarly, if the other device(s) 140 do not require energy at a particular time, the wireless charger 105 may radiate energy at a power emission level that does not reach the other device(s).

By the example in FIG. 1, it can be seen that the power emission level (also referred to as a setting) of the energy radiated from the wireless charger 105 can be managed. The power emission level can be determined based on the device energy profile (e.g., amount of energy required to operate the device), as well as the time in which the power is needed (e.g., a schedule of operation).

Figure 2:
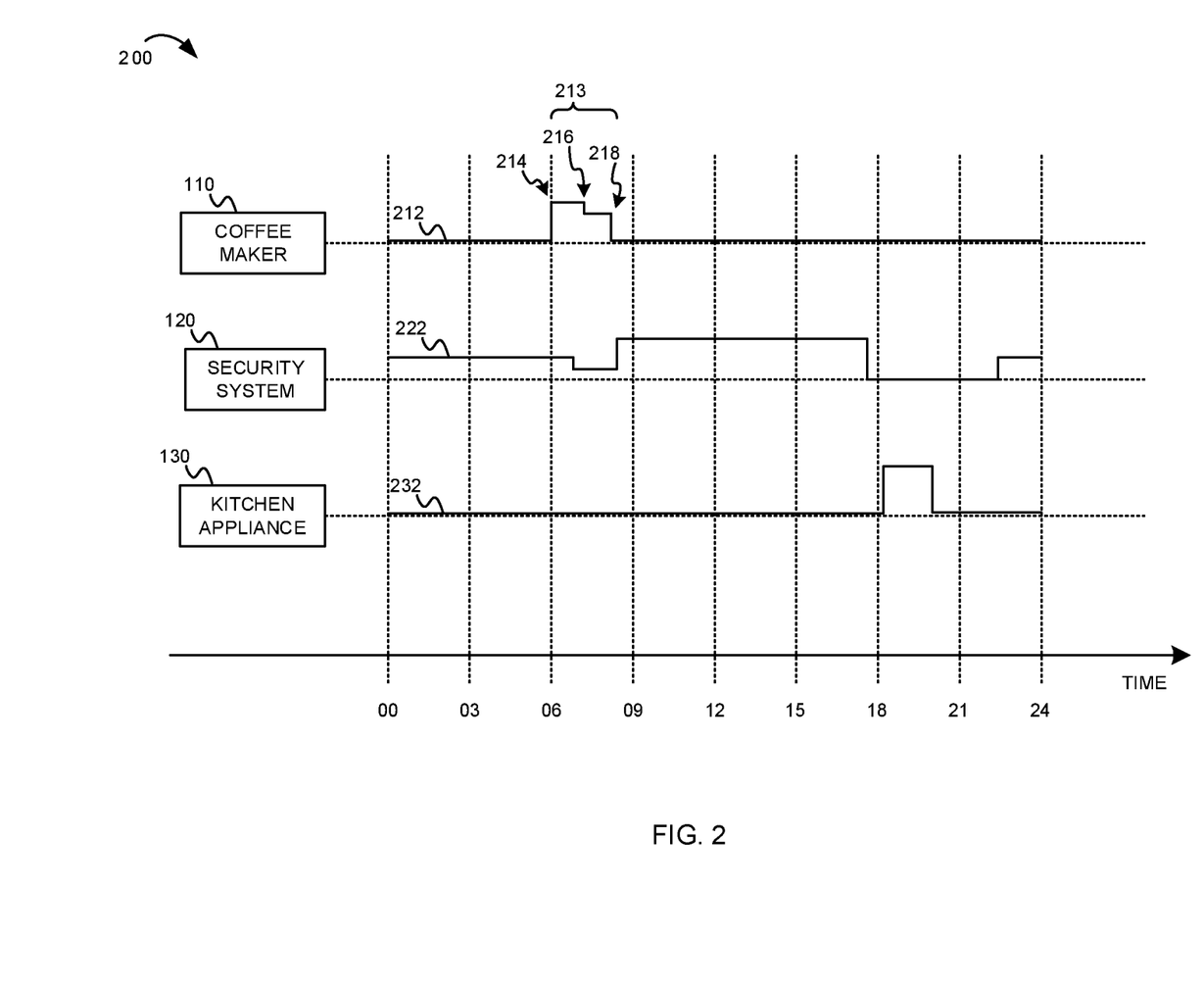
FIG. 2 is a histogram chart illustrating example device power requirement schedules in accordance with an embodiment of this disclosure.

FIG. 2 is a histogram chart illustrating example device power requirement schedules in accordance with an embodiment of this disclosure. The histogram 400 shows example device power requirement schedules for the coffee maker 110, security system 120, and kitchen appliance 130, plotted over the schedule of a typical day. The schedule may be a set, in part, by a user input. For example, a user interface may be provided by the wireless charger 105 or a centralized server (not shown) to receive user input for typical functions of power-consuming devices managed by the wireless charger 105. In addition to the schedule of operation, the device power requirement schedules may include the device energy profile for a particular device. The device energy profile indicates how much energy is consumed by the device (under wireless power) for operating the device. The device energy profile may also be obtained, in part, from a database which indicates the power consumed by particular devices for certain functions. For example, a database may include device manufacturer specifications for power consumption.

Starting with a first example device power requirement schedule 212, a user may schedule morning coffee to be brewed by the coffee maker 110. The coffee maker 110 may be a "smart" device which is capable of receiving wireless energy by an internal receiver. Alternatively, the coffee maker 110 may be a traditional wired coffee maker which has been plugged into a wireless power receiver (rather than the wall socket). By providing wireless power to the coffee maker at a scheduled time, the wireless charger may manage the operation of the coffee maker 110. Starting at morning hours, from midnight to 06:00 am, the coffee maker 110 may be off (or require only minimal, negligible, amount of energy). At 06:00 am, the coffee maker 110 may begin a period of operation 213. At 214, the wireless charger 105 may deliver a first level of wireless energy to the coffee maker. For example, the coffee maker 110 may require a greater amount of energy during a first phase (e.g., heat and brew) than it requires during a second phase (e.g., keep warm). At 216, the wireless charger 105 may reduce the amount of wireless energy delivered to the coffee maker 110 when the coffee maker 110 enters the second phase, the wireless charger 105 may reduce the power emission level so that less energy is transmitted to the coffee maker 110. Doing so may conserve wireless energy that is otherwise unneeded by the coffee maker 110. Then, at 218, the wireless charger 105 may further reduce the power emission level to conserve energy and cause the coffee maker 110 to shut off.

The security system 120 may have a different schedule of operation, as shown in FIG. 2. For example, more power may be needed during daytime hours for some components of the security system that are used during the day, while less power may be needed during the evening or nighttime when different components might be used. Once again, the device power requirement schedule 222 for the security system 120 may be specific to the manufacture of the security system 120, the components included, and the power requirements for each component that will be used at various times in the schedule.

FIG. 2 also includes an example device power requirement schedule 232 for the kitchen appliance 130. In the example of FIG. 2, the kitchen appliance 130 may only be operated during the evening hours from 18:00 to 20:00. For example, the kitchen appliance 130 may be an oven or stove which can be programmed to cook a meal at a particular time. The wireless charger 105 can deliver wireless power to the kitchen appliance 130 when it is needed, and not deliver wireless power when it is not needed.

Figure 3:
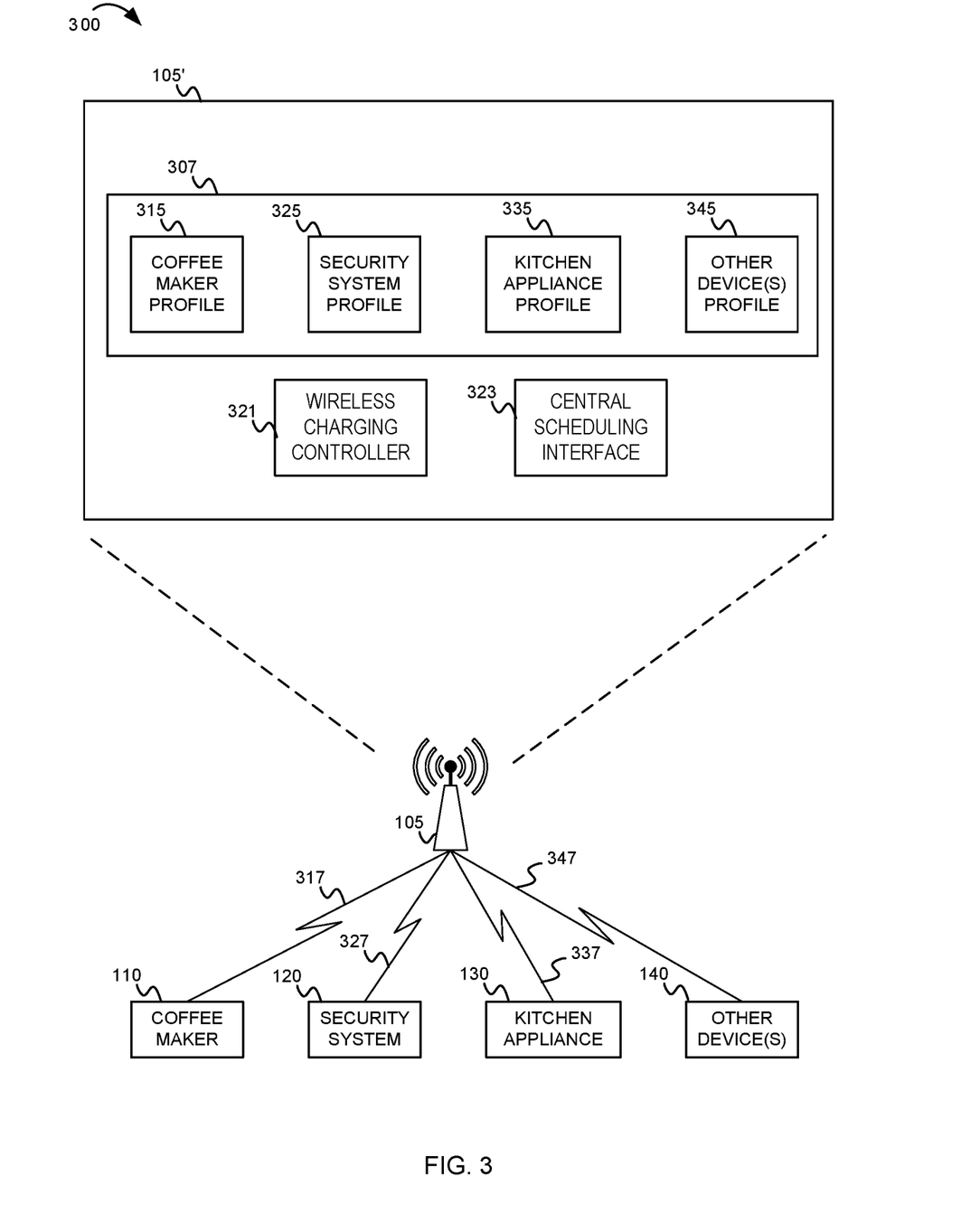
FIG. 3 is a block diagram illustrating components of a wireless power system in accordance with an embodiment of this disclosure.

FIG. 3 is a block diagram illustrating components of a wireless power system in accordance with an embodiment of this disclosure. The wireless charging system 300 includes similar components as described in the wireless charging system 100 of FIG. 1. The wireless charging system 300 includes the wireless charger 105, coffee maker 110, security system 120, kitchen appliance 130, and other device(s). In FIG. 3, the wireless charger 105 is expanded to show an example wireless charger 105' in accordance with an embodiment of this disclosure. The wireless charger 105' includes a wireless charging controller 321 and a central scheduling interface 323. The central scheduling interface 323 may be used to coordinate the schedule of operation for one or more devices. For example, the central scheduling interface 323 may be configured to receive a user input indicating the schedule of operation. In one embodiment, the central scheduling interface 323 may receive a message from a corresponding application or interface executing on a user device.

The wireless charging controller 321 may utilize the schedule of operation managed by the central scheduling interface 323 in addition to device energy profiles for one or more devices. For example, the memory 307 may store a coffee maker profile 315, a security system profile 325, a kitchen appliance profile 325, and other device(s) profile(s) 345 corresponding to coffee maker 110, security system 120, kitchen appliance 130, and other device(s), respectively. The device energy profiles may be obtained from various locations and stored in the memory 307 for use by the wireless charging controller 321. For example, the device energy profiles may be retrieved from a central database (not shown) which could be local or remote from the wireless charger 105. The device energy profiles may be obtained from a manufacturer specification. In one embodiment, the device energy profile may be obtained from the devices themselves, such as when the power-consuming device is a smart device capable of providing a message with its device energy profile. Alternatively, the device energy profiles may be received via a user interface of a user device.

The wireless charging controller 321 may use both the schedule of operation from the central scheduling interface 323 and the device energy profiles for corresponding devices that are scheduled to be active/operated at a scheduled time to determine the power requirement (e.g., the amount of energy needed to be delivered to the target device at the scheduled time). The power requirement may be translated to a power emission level by an algorithm at the wireless charger 105'. For example, a relationship table between the power requirement and the power emission level may be maintained at the wireless charger 105. Alternatively, the power emission level can be calculated mathematically using an algorithm or formula at the wireless charger 105. In a simplest implementation, the relationship between power requirement and power emission level can be a linear scale.

In some embodiments, the location of the device to be wirelessly powered may also be determined. Additionally, or alternatively, the distance from the wireless charger 105 to the device may be determined. For example, the distance between the wireless charger 105 and the device may impact the amount of wireless energy that can be harvested at the device after transmission from the wireless charger. Greater distances may result in less energy that can be harvested. To compensate for distance, the power emission level may be adjusted so that the amount of energy harvested by the device is at or above the power requirement for the device at the scheduled time.

Figure 4:
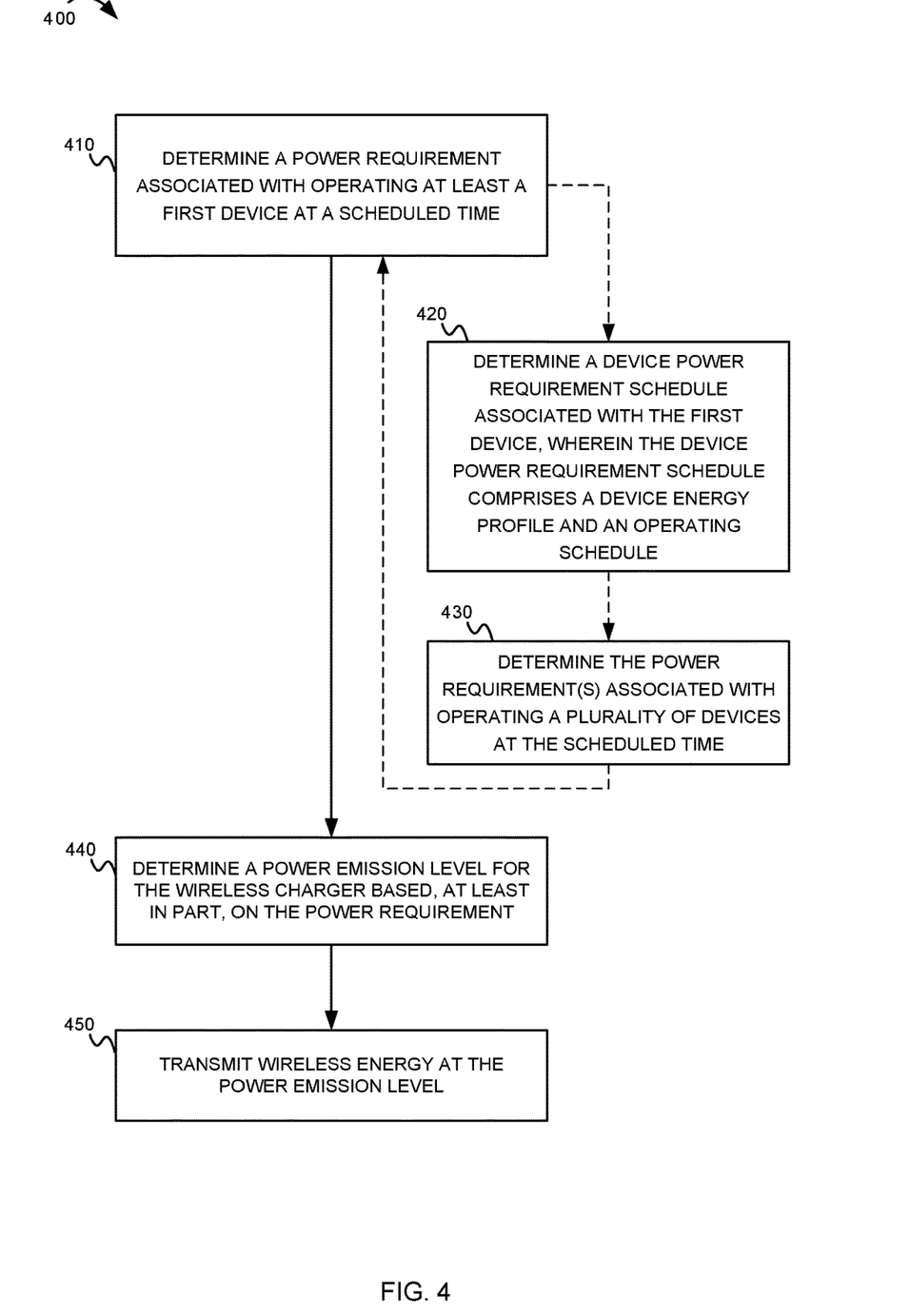
FIG. 4 is a flow chart illustrating example operations performed by a wireless power controller in accordance with an embodiment of this disclosure.

There may be formulas or other calculations that can be used to determine an amount of energy that could be harvested by the device. Below is one example:

$$P_r = \frac{G_s G_r \eta}{L_p} \left(\frac{\lambda}{4\pi(d+\beta)}\right)^2 P_o$$

where d is the distance between the wireless charger and the device, $P_o$ is the source power, $G_s$ is the source antenna gain, $G_r$ is the receive antenna gain, $L_p$ is polarization loss, $\lambda$ is the wavelength, $\eta$ is rectifier efficiency, and $\beta$ is a parameter to adjust the equation for short distance transmission. The equation is based on Friis transmission equation used in telecommunications engineering, which gives the power received by one antenna some distance away from another antenna transmitting a known amount of power. Except for distance d, all other parameters in the equation are constant values based on the environment and device settings. This model is based on the Friis' free space equation and has been experimentally shown to be a good approximation of charged energy. To further validate this charging model, we perform additional experiments to investigate the charged power by varying distances between FIG. 4 is a flow chart illustrating example operations performed by a wireless power controller in accordance with an embodiment of this disclosure. The flow chart 200 begins at block 410.

At block 410, the wireless charger may determine a power requirement associated with operating at least a first device at a scheduled time. To determine the power requirement, the wireless charger may perform operations with respect to one or more devices that may have a power requirement. For example, at block 420, the wireless charger may determine a device power requirement schedule associated with the first device. The device power requirement schedule may comprise a device energy profile and an operating schedule for the first device. In another example, at block 430, the wireless charger may determine the power requirement associated with operating a plurality of devices at the scheduled time.

After block 410, the flow chart 400 continues to block 440. At block 440, the wireless charger determines a power emission level for the wireless charger based, at least in part, on the power requirement. At block 450, the wireless charger transmits wireless energy at the power emission level.

Figure 5:
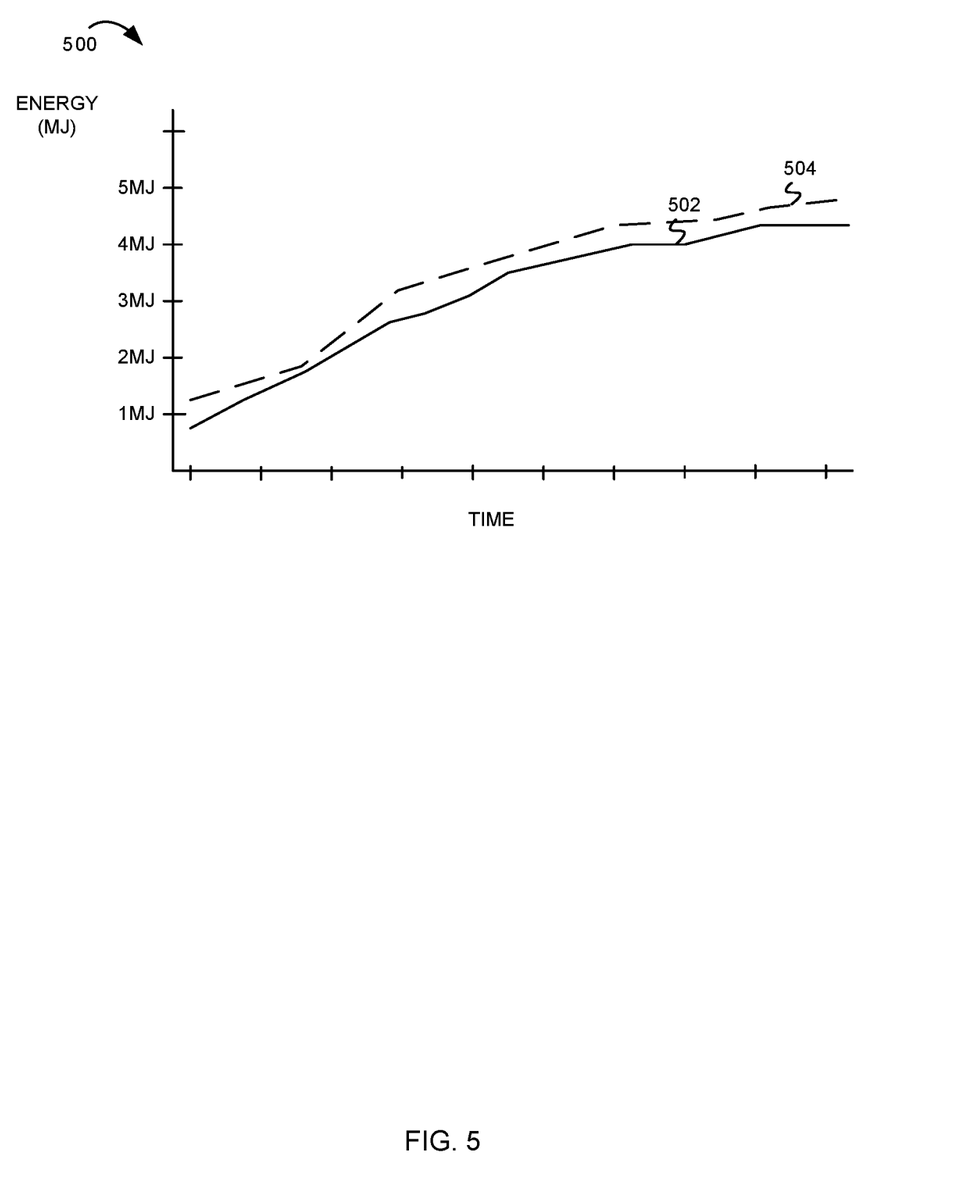
FIG. 5 is a chart illustrating an example line graph showing wireless power supply and device power requirements in accordance with an embodiment of this disclosure.

FIG. 5 is a chart illustrating an example line graph showing wireless power and device power requirements in accordance with an embodiment of this disclosure. The chart 500 shows a measurement of energy on the y-axis (in millijoules) and a schedule of time on the x-axis. A solid line 502 indicates the power requirement for one or more devices at various times through the schedule. A dashed line 504 indicates the amount of energy to be delivered from the wireless charger to the one or more devices. By manipulating the power emission level at the wireless charger, the wireless charger can manage the amount of energy delivered to the one or more devices over time. FIG. 5 shows the impact of modeling the power requirements. Adjusting the power emission level of the wireless charger over time can result in a more efficient delivery of power (at or just over the amount needed) without transmitting excess energy that is not needed for the power requirement to be satisfied.

Figure 6:
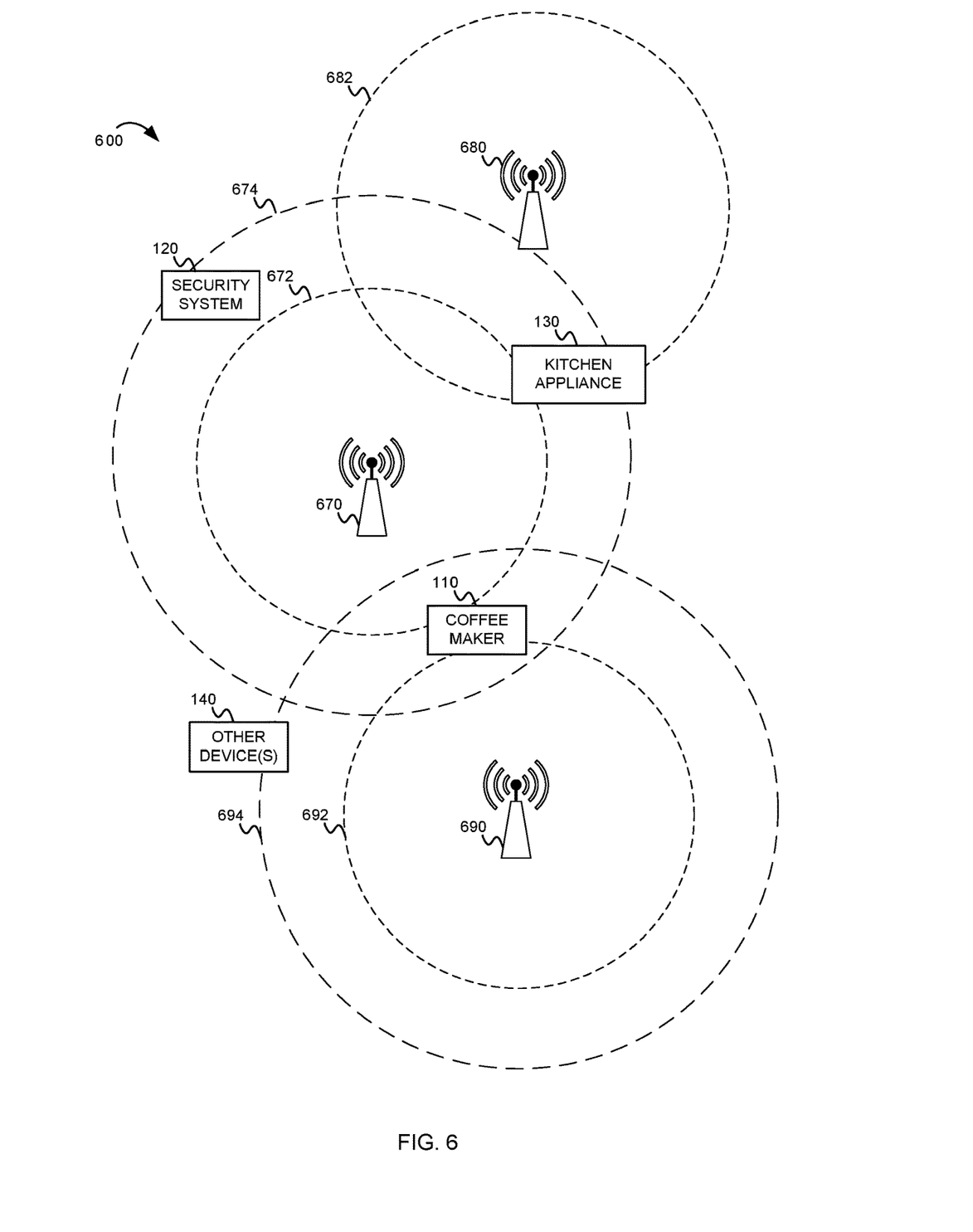
FIG. 6 is a block diagram illustrating coordination of multiple wireless chargers in accordance with an embodiment of this disclosure.

FIG. 6 is a block diagram illustrating coordination of multiple wireless chargers in accordance with an embodiment of this disclosure. In the example wireless power system 600, multiple wireless chargers are present. A first wireless charger 670, a second wireless charger 680, and a third wireless charger 690 may coordinate their power emission levels to deliver power to the power-consuming devices. The multiple wireless chargers may communicate with each other (either directly or through a centralized communication server) so that each wireless charger has the schedule of operation and device energy profiles for devices in their range. Furthermore, in some embodiments, the wireless chargers may determine locations of the power-consuming devices and other wireless chargers. By coordinating, the wireless chargers can avoid a scenario where two or more wireless chargers deliver a full power requirement of wireless energy to the same device. Furthermore, the wireless chargers may combine their wireless energy transmissions to fulfill the power requirement in union. A few examples are described briefly below.

The first wireless charger 670 and second wireless charger 680 may both contribute wireless energy to the kitchen appliance 130. For example, the first wireless charger 670 may radiate energy using either the first area 672 or the second area 674. At a time when the first wireless charger 670 is transmitting wireless energy to satisfy a power requirement of the security system 120, the kitchen appliance 130 may also receive sufficient energy from the first wireless charger 670. In this scenario, the second wireless charger 680 may refrain from transmitting wireless energy in its coverage area 682. However, if the 120 is not powered and the first wireless charger 670 is only transmitting enough energy to its first area 672, then the second wireless charger 680 may also transmit wireless energy. Together the wireless energy from the first wireless charger 670 (in area 672) and the wireless energy from the second wireless charger 680 (in area 682) may combine to satisfy the power requirement of the kitchen appliance 130.

Similarly, the coffee maker 110 may be powered by the combination of wireless energy from the first wireless charger 670 and the third wireless charger 690 (in area 692). In another time period, the third wireless charger 690 may transmit wireless energy at a higher power level to satisfy a power requirement for other device(s) (in area 694). During this time period, the wireless energy to the coffee maker 110 may be sufficient to power the coffee maker 110 without a transmission of wireless energy from the first wireless charger 670.

Thus, the first wireless charger 670, second wireless charger 680, and third wireless charger 690 may consider the locations of power-consuming devices, the schedule of operation, and the device energy profiles for those devices to determine an efficient distribution of power from among the multiple wireless chargers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
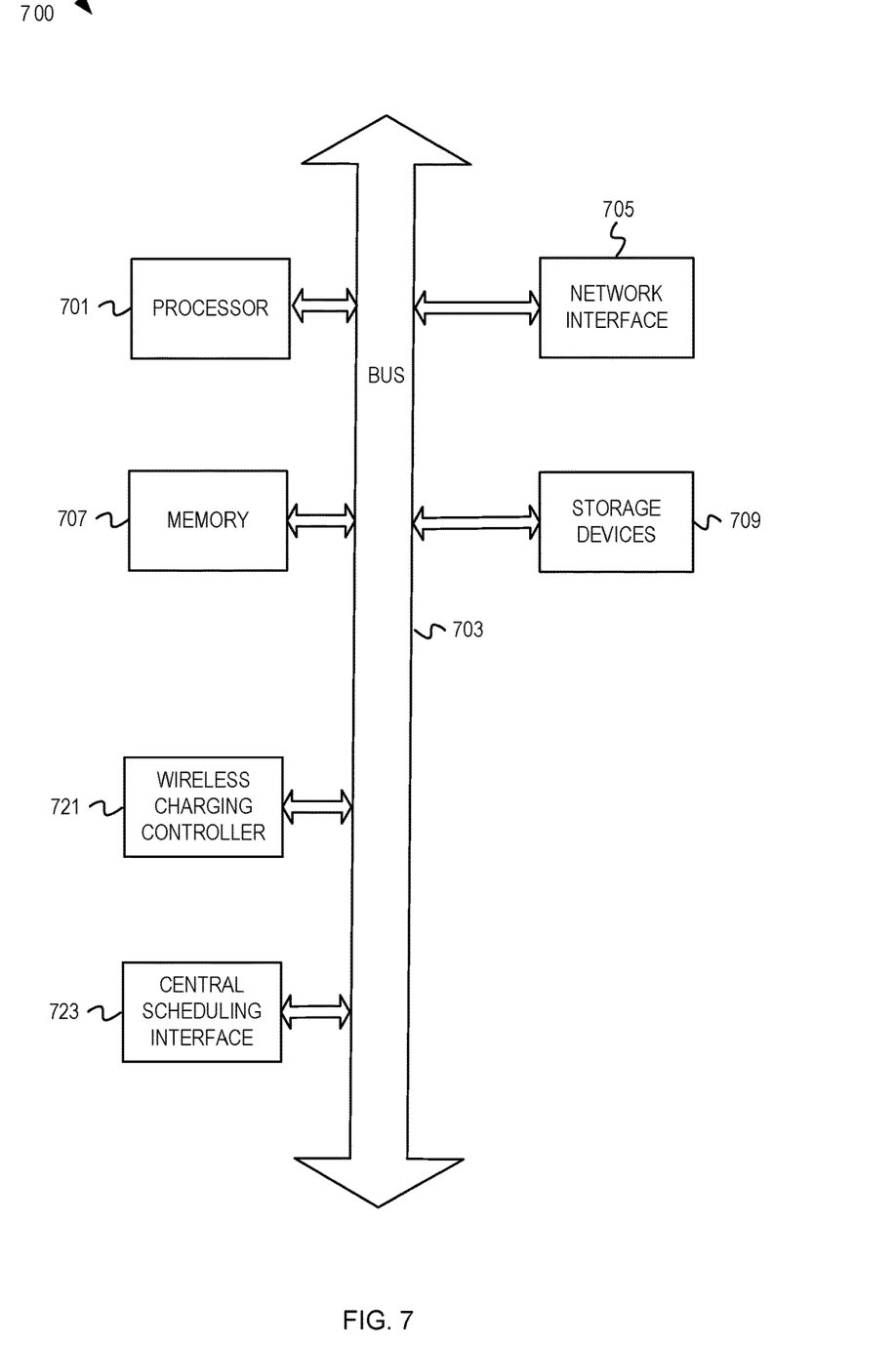
FIG. 7 depicts an example computer system in accordance with embodiments of this disclosure.

FIG. 7 depicts an example computer system 700. A computer system includes a processor 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport®, InfiniBand®, NuBus, etc.), a network interface 705 (e.g., an ATM interface, an Ethernet interface, a Frame Relay interface, SONET interface, wireless interface, etc.), and a storage device(s) 709 (e.g., optical storage, magnetic storage, etc.). The computer system 700 may also include a wireless charging controller 721 (similar to wireless charging controller 321) and a central scheduling interface 723 (similar to central scheduling interface 323).

The system memory 707 embodies functionality to implement embodiments described above. For example, the system memory 707 may include instructions which, when executed by the processor 701, cause the computer system to perform any of the functionality described in FIGS. 1-6. Any one of these functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701, the storage device(s) 709, and the network interface 705 are coupled to the bus 703. Although illustrated as being coupled to the bus 703, the memory 707 may be coupled to the processor 701.

While the embodiments are described with reference to various implementations and exploitations, it will be understood that these embodiments are illustrative and that the scope of the present subject matter is not limited to them. In general, techniques for providing wireless power to devices as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the described subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present subject matter.

What is claimed is:

1. A method comprising:
   determining a schedule of operation for at least a first device;
   determining one or more power requirements associated with operating the first device;
   shifting the first device from a shut-off state to a first operational state at a first scheduled time, wherein the first scheduled time is determined according to the schedule of operation; and
   transmitting a first amount of wireless energy from a wireless charger to the first device at the first scheduled time, wherein the first amount of wireless energy is based, at least in part, on the power requirement associated with operating the first device at the first operational state.

2. The method of claim 1, wherein determining the schedule of operation includes determining at least part of the schedule of operation from a user input.

3. The method of claim 1, wherein determining the power requirement includes determining a first device power requirement schedule associated with the first device, wherein the first device power requirement schedule is based, at least in part, on a first device energy profile for the first device and the schedule of operation.

4. The method of claim 3, wherein determining the power requirement includes obtaining at least part of the first device energy profile from a database having a plurality of device energy profiles associated with a corresponding plurality of devices.

5. The method of claim 1, wherein determining the power requirement includes determining the power requirement associated with operating a plurality of devices at the scheduled time, the power requirement including a first device power requirement for the first device and a second device power requirement for a second device.

6. The method of claim 1, wherein transmitting the amount of wireless energy includes determining a power emission level for the wireless charger based, at least in part, on the power requirement, the power requirement representing how much wireless energy will be consumed by the first device to operate the first device during the scheduled time.

7. The method of claim 1, further comprising:
   shifting the first device from the first operational state to a second operational state at a second scheduled time, wherein the second scheduled time is determined according to the schedule of operation;
   transmitting a second amount of wireless energy to the first device at the second scheduled time, wherein the second amount of wireless energy is based, at least in part, on the power requirement associated with operating the first device at the second operational state;

shifting the first device from the second operational state to a shut-off state according to the schedule of operation; and
discontinuing transmission of the second amount of wireless energy to the first device.

8. The method of claim 1, wherein determining the power requirement comprises:
determining a plurality of devices in a wireless charging field of the wireless charger;
determining a plurality of device power requirement schedules corresponding to the plurality of devices; and
wherein the power requirement for the scheduled time comprises a maximum power requirement for the scheduled time from among the plurality of device power requirement schedules.

9. The method of claim 1, further comprising:
estimating an amount of other wireless energy to be delivered to the first device from one or more other wireless chargers; and
reducing the power requirement by the amount of other wireless energy.

10. The method of claim 9, further comprising:
coordinating with the one or more other wireless chargers to determine the amount of other wireless energy to be delivered from the one or more other wireless chargers, wherein both of at least a first wireless charger and a second wireless charger contribute portions of wireless energy to satisfy the power requirement associated with operating the first device at the scheduled time.

11. An apparatus for wireless charging, the apparatus comprising:
a processor; and
memory having instructions stored therein which, when executed by the processor, cause the apparatus to:
determine a schedule of operation for at least a first device;
determine one or more power requirements associated with operating the first device;
shift the first device from a shut-off state to a first operational state at a first scheduled time, wherein the first scheduled time is determined according to the schedule of operation; and
transmit a first amount of wireless energy from a wireless charger to the first device at the first scheduled time, wherein the first amount of wireless energy is based, at least in part, on the power requirement associated with operating the first device at the first operational state.

12. The apparatus of claim 11, wherein the instructions, when executed by the processor, cause the apparatus to:
determine at least part of the schedule of operation from a user input.

13. The apparatus of claim 11, wherein the instructions, when executed by the processor, cause the apparatus to:
determine a first device power requirement schedule associated with the first device, wherein the first device power requirement schedule is based, at least in part, on a first device energy profile for the first device and the schedule of operation.

14. The apparatus of claim 13, wherein the instructions to determine the first device power requirement schedule comprises instructions which, when executed by the processor, cause the apparatus to:
obtain at least part of the first device energy profile from a database having a plurality of device energy profiles associated with a corresponding plurality of devices.

15. The apparatus of claim 11, wherein the instructions, when executed by the processor, cause the apparatus to:
determine the power requirement associated with operating a plurality of devices at the scheduled time, the power requirement including a first device power requirement for the first device and a second device power requirement for a second device.

16. The apparatus of claim 11, wherein the instructions, when executed by the processor, cause the apparatus to:
determine a power emission level for the wireless charger based, at least in part, on the power requirement, the power requirement representing how much wireless energy will be consumed by the first device to operate the first device during the scheduled time.

17. The apparatus of claim 11, wherein the instructions, when executed by the processor, cause the apparatus to:
shifting the first device from the first operational state to a second operational state at a second scheduled time, wherein the second scheduled time is determined according to the schedule of operation;
transmitting a second amount of wireless energy to the first device at the second scheduled time, wherein the second amount of wireless energy is based, at least in part, on the power requirement associated with operating the first device at the second operational state;
shifting the first device from the second operational state to a shut-off state according to the schedule of operation; and
discontinuing transmission of the second amount of wireless energy to the first device.

18. The apparatus of claim 11, wherein the instructions, when executed by the processor, cause the apparatus to:
determine a plurality of devices in a wireless charging field of the wireless charger;
determine a plurality of device power requirement schedules corresponding to the plurality of devices; and
wherein the power requirement for the scheduled time comprises a maximum power requirement for the scheduled time from among the plurality of device power requirement schedules.

19. The apparatus of claim 11, wherein the instructions, when executed by the processor, cause the apparatus to:
estimate an amount of other wireless energy to be delivered to the first device from one or more other wireless chargers; and
coordinate with the one or more other wireless chargers to determine the amount of other wireless energy to be delivered from the one or more other wireless chargers, wherein both of at least a first wireless charger and a second wireless charger contribute portions of wireless energy to satisfy the power requirement associated with operating the first device at the scheduled time.

20. A computer program product for a wireless charger, the computer program product comprising:
a computer readable storage medium having computer usable program code embodied therewith, the computer usable program code configured to:
determine a schedule of operation for at least a first device;
determine one or more power requirements associated with operating the first device;
shift the first device from a shut-off state to a first operational state at a first scheduled time, wherein the first scheduled time is determined according to the schedule of operation; and
transmit a first amount of wireless energy from the wireless charger to the first device at the first scheduled time, wherein the first amount of wireless energy is based, at least in part, on the power requirement associated with operating the first device at the first operational state.

* * * * *